(12) United States Patent
Jimenez

(10) Patent No.: US 12,337,426 B2
(45) Date of Patent: Jun. 24, 2025

(54) PREHEATING DEVICE FOR WELDING OF OIL, GAS AND GEOTHERMAL WELLHEADS OF VARYING DIAMETERS AND THICKNESSES

(71) Applicant: Juan Manuel Ceballos Jimenez, Alvaro Obregon (MX)

(72) Inventor: Juan Manuel Ceballos Jimenez, Alvaro Obregon (MX)

( * ) Notice: Subject to any disclaimer, the term of this patent is extended or adjusted under 35 U.S.C. 154(b) by 578 days.

(21) Appl. No.: 17/808,190

(22) Filed: Jun. 22, 2022

(65) Prior Publication Data

US 2023/0122573 A1    Apr. 20, 2023

(51) Int. Cl.
*B23K 9/10* (2006.01)
*B23K 101/10* (2006.01)
*E21B 33/03* (2006.01)

(52) U.S. Cl.
CPC ............ *B23K 9/1093* (2013.01); *E21B 33/03* (2013.01); *B23K 2101/10* (2018.08)

(58) Field of Classification Search
CPC ... B23K 9/1093; B23K 2101/10; E21B 33/03; E21B 33/037; E21B 33/04; E21B 33/0407; E21B 33/043
See application file for complete search history.

(56) References Cited

U.S. PATENT DOCUMENTS

| | | | | |
|---|---|---|---|---|
| 4,927,386 | A  * | 5/1990 | Neuroth | E21B 17/028 439/588 |
| 5,667,008 | A  * | 9/1997 | Moore | H01R 13/5208 166/97.5 |
| 6,145,597 | A  * | 11/2000 | Kobylinski | E21B 17/003 166/384 |
| 6,758,668 | B1 * | 7/2004 | Wardlaw | B23K 31/02 432/224 |
| 7,232,347 | B1 * | 6/2007 | Moore | H02G 15/113 174/89 |
| 7,589,280 | B2 * | 9/2009 | Nelson | G01N 27/407 73/23.31 |
| 9,071,008 | B2 * | 6/2015 | Zillinger | H01R 13/533 |
| 10,837,252 | B2 * | 11/2020 | Angers, Jr. | E21B 33/0407 |
| 10,947,808 | B2 * | 3/2021 | Angers, Jr. | E21B 33/068 |

* cited by examiner

*Primary Examiner* — Brian W Jennison
(74) *Attorney, Agent, or Firm* — WELSH FLAXMAN & GITLER; Stewart L Gitler

(57) ABSTRACT

The present invention relates to a preheating device for welding oil, gas, and geothermal wellheads of varying diameters and thicknesses which is applicable to the oil, gas, and geothermal industry. The preheating of head and coating pipes to be welded do not cool down quickly. The cooling speed reduction prevents structures or joints from being less susceptible to cracking by maintaining the necessary heat thus preventing the integrity of the joints from being exposed. The preheating of head and coating to be welded maintains a uniform and constant temperature avoiding temperature changes, thus making the structures or joints less susceptible to cracking by maintaining the necessary heat and preventing the integrity of the joints from being exposed.

5 Claims, 7 Drawing Sheets

PREHEATING DEVICE FOR WELDING OF OIL, GAS AND GEOTHERMAL WELLHEADS OF VARYING DIAMETERS AND THICKNESSES

FIELD OF THE INVENTION

The present invention relates to a preheating device for welding oil, gas, and geothermal wellheads of varying diameters and thicknesses which applies to the oil, gas, and geothermal industry. Preheating allows coating heads and tubing to maintain a uniform temperature and not to cool down quickly. The cooling speed reduction prevents structures or joints from being less susceptible to cracking by maintaining the necessary heat thus preventing the integrity of the joints from being exposed. There are several methods of pipe preheating, such as flame, induction, and resistance, among others.

BACKGROUND OF THE INVENTION

The installation and welding of oil, gas and geothermal wellheads require that the welding process be performed by preheating the area to be welded in a range of 3 inches (7.62 cm) in each joint and should reach a preheating temperature of 400° F. to 600° F. (204° C. to 370° C.), in order to avoid the modification of the microstructure of the base materials, since the heat-affected zone (HAZ) can reach austenitic structures that, in the cooling process, are transformed into martensitic phases, these crystalline structures of great hardness, favor cracking, both in the welding and cooling process, as well as in fatigue work.

As established, the main objective of preheating is to maintain a uniform temperature and reduce the cooling rate during the welding operation, in order to:

Modify the microstructure

Promote hydrogen diffusion

Modify the level and distribution of residual stresses.

From a general viewpoint, preheating includes the interpass temperature in multipass welding when the heat generated during welding is not sufficient to maintain the preheat temperature between successive passes.

The preheating temperature is the minimum temperature that must be reached throughout the thickness of the material before welding, and which must extend over a sufficiently wide area on both sides of the joint to be welded.

The preheating temperature must be balanced with the heat input during the welding operation according to the type of steel and according to the properties required for the welded joint. To withstand the service conditions mainly due to the reduction of the problems mentioned above.

At present, there exists in the state of the art inventions that provide a preheating to the pipes before being welded; these are:

Mexican Patent No. 247137, relates to a preheating apparatus for pipes, which supports a hollow, cylindrical fuel heating element. A solid fuel mixture is used to generate hot gases for heating metal surfaces for pre-welding purposes. A slot channel is inserted radially around the upper portion of the solid fuel mixture. An oxygen releasing pre-initiator compound is housed in the slot channel for uniform ignition uniformity of the flammable solid fuel to allow for more consistent and uniform burning of the flammable solid fuel to allow for more consistent and uniform burning of the flammable solid fuel during hot gas generation.

U.S. Pat. No. 3,082,760, refers to a preheating device that uses a mixture of fuel and air which is directed to the end of the pipe for welding.

The cited art state, indicates that they are exothermic joining processes, so special care is required for its use, since being an exothermic process generates fire, once ignited the preheater cannot be extinguished, special procedures are required to quench it.

An additional disadvantage of the state of the art is the use of solid fuel that when burning generates combustion gases released into the atmosphere, leaving a solid residue of the mixture of burned components.

This type of preheating system can only be used once, which means that it cannot be reused for subsequent joints, which has a technical and economic disadvantage.

As mentioned, it is indispensable that the preheating systems have a constant temperature, otherwise they generate cracks in the weld. Since the heat is produced by fuel, it cannot be regulated to control the temperature, which generates the need for additional equipment and processes to verify the quality of the weld.

SUMMARY OF THE INVENTION

The preheating device for welding of heads and coating for oil, gas, and geothermal wells of variable diameters and thicknesses of the present invention solves the technical, economic, and environmental problems by producing the preheating heat by electric energy.

The preheating device for welding of heads and coating for oil, gas, and geothermal wells of variable diameters and thicknesses allows total control of on, off, and desired temperature by having energy and temperature regulating devices. In addition, the electrical energy required by the device can be supplied by clean energies, so it does not generate pollutant residues either solid or gas.

The device of the present invention can be used in several services, which allows an economic savings and a technological improvement with respect to the state of the art.

The present invention comprises temperature regulating devices since it has at least two thermocouples for temperature sensing and recording, allowing to maintain a constant heat depending on the calorific needs, thus ensuring that no cracks occur due to the change of temperature when welding.

DETAILED DESCRIPTION OF THE INVENTION

Figure 1:
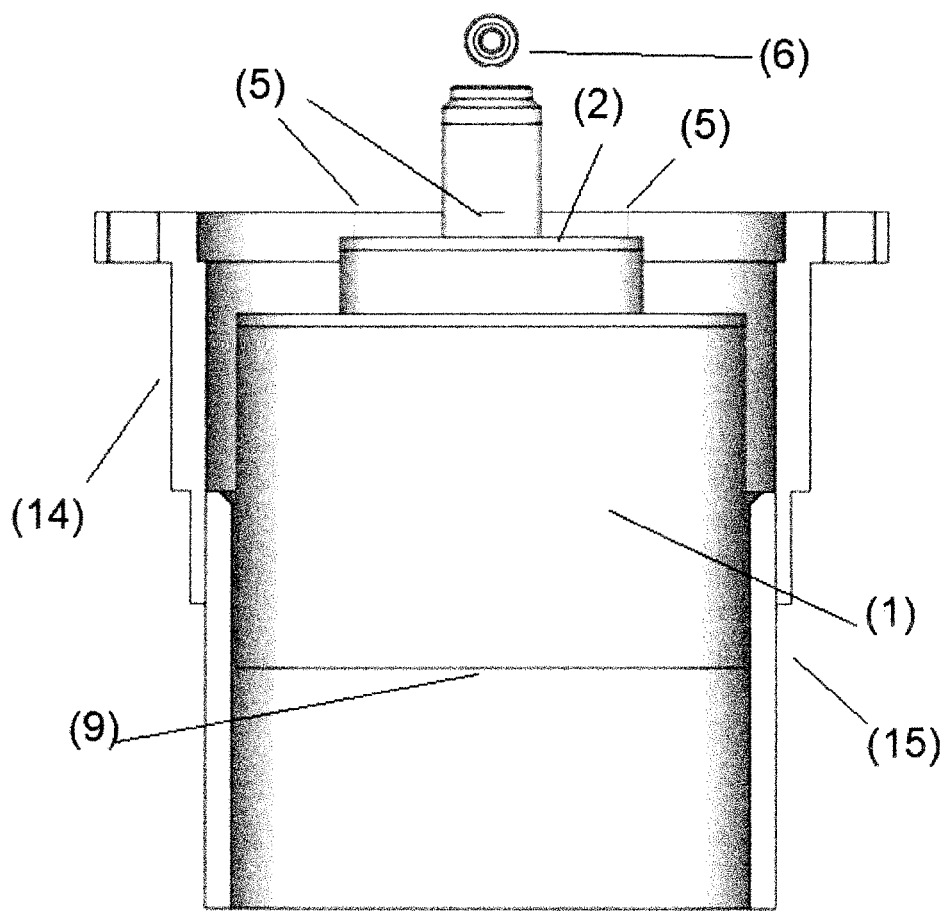
FIG. 1 is a view of the preheating device for pipes of variable diameters and thicknesses placed inside the pipe.
Figure 2:
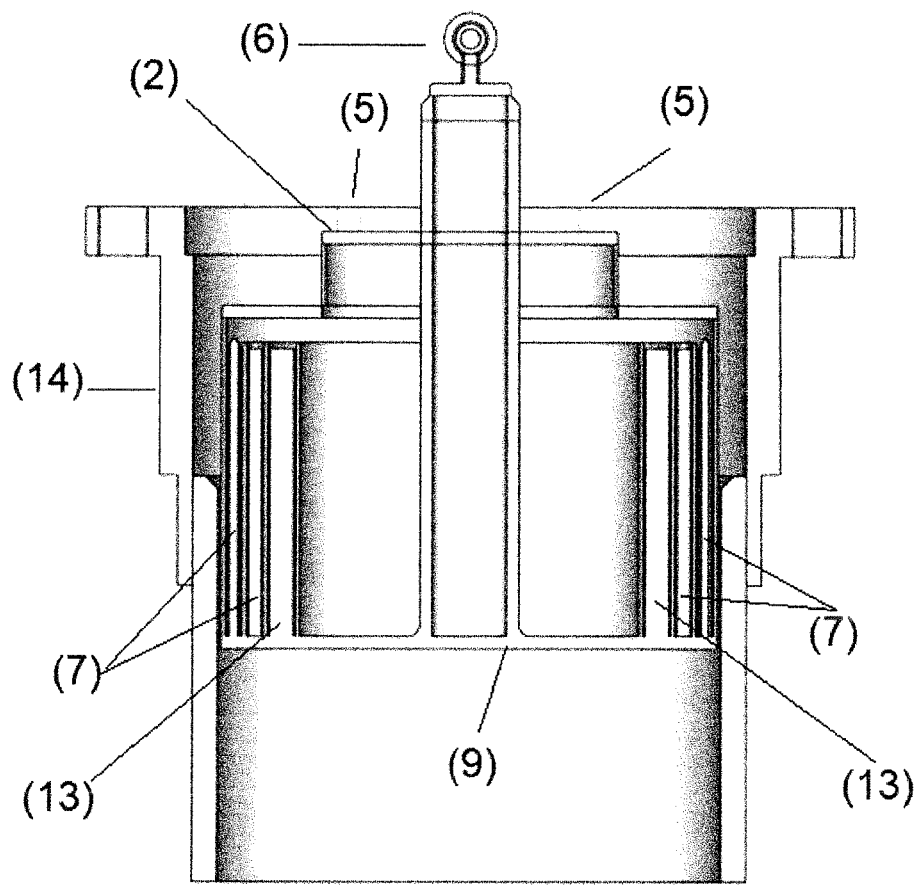
FIG. 2 is a view of the preheating device for pipes of variable diameters and thicknesses partially segmented showing the upper and inner components of the device, inserted in the pipe to be welded.
Figure 3:
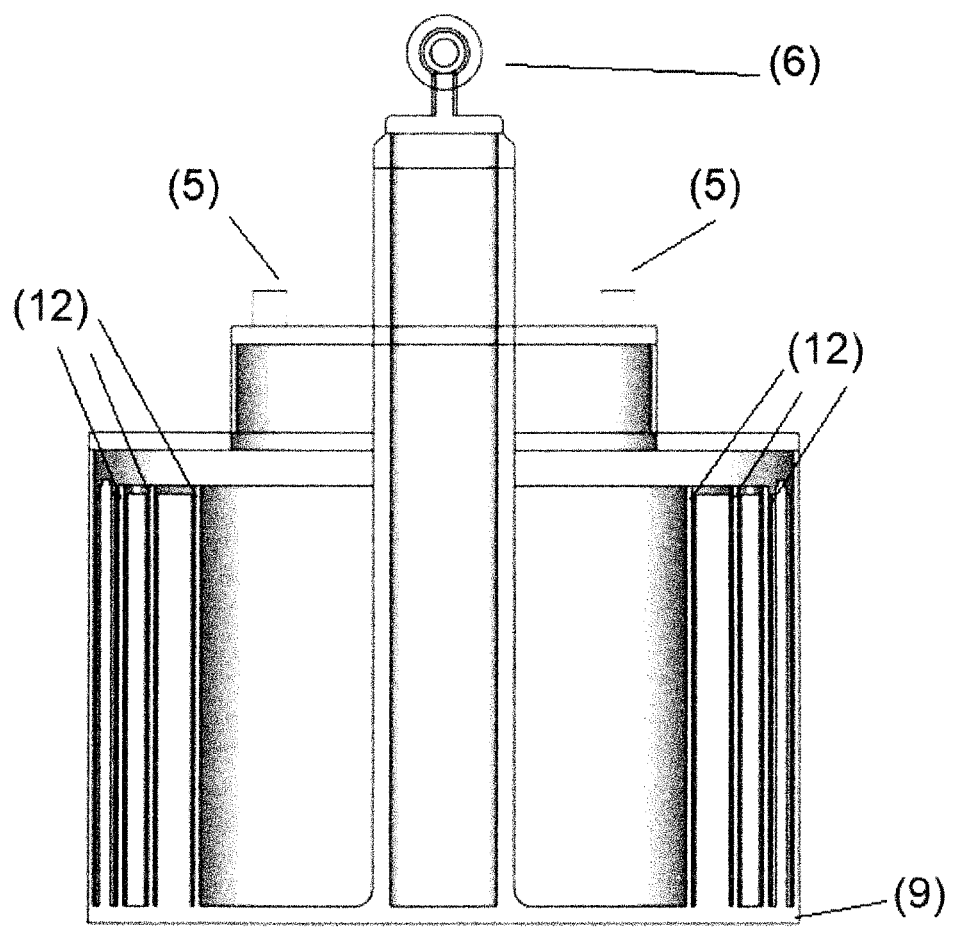
FIG. 3 is a view of the partially segmented preheating device for tubes of variable diameters and thicknesses showing the upper and inner components of the device, outside in the tube to be welded.
Figure 4:
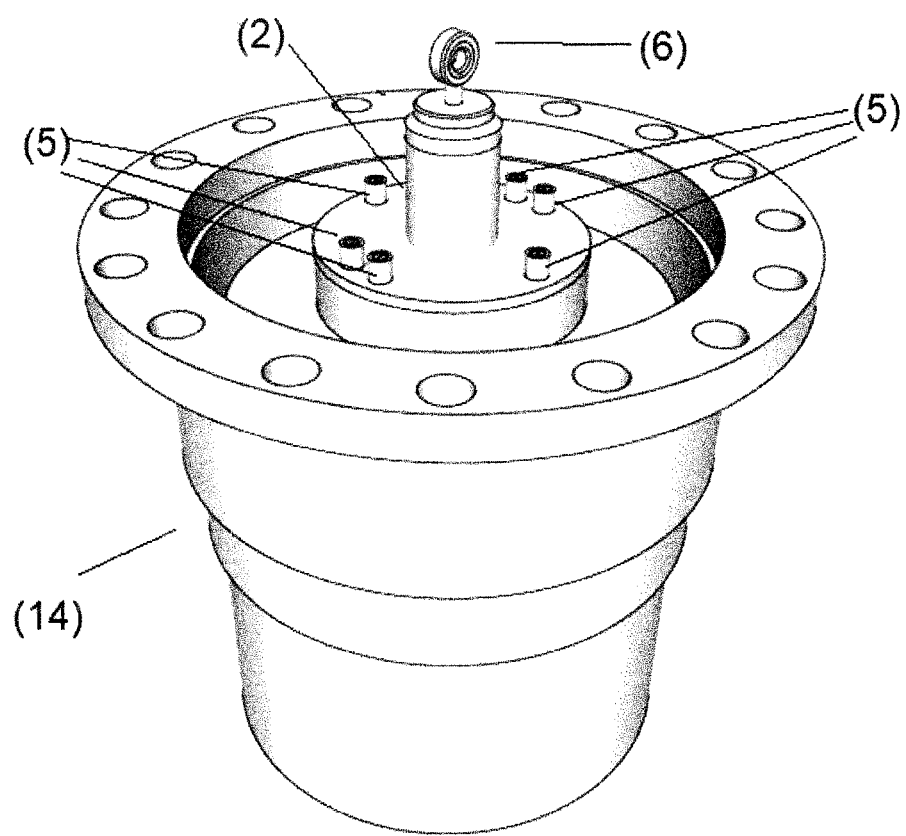
FIG. 4 is a top perspective view of the preheating device for tubes of variable diameters and thicknesses inserted into the tube to be welded showing the upper devices.
Figure 5:
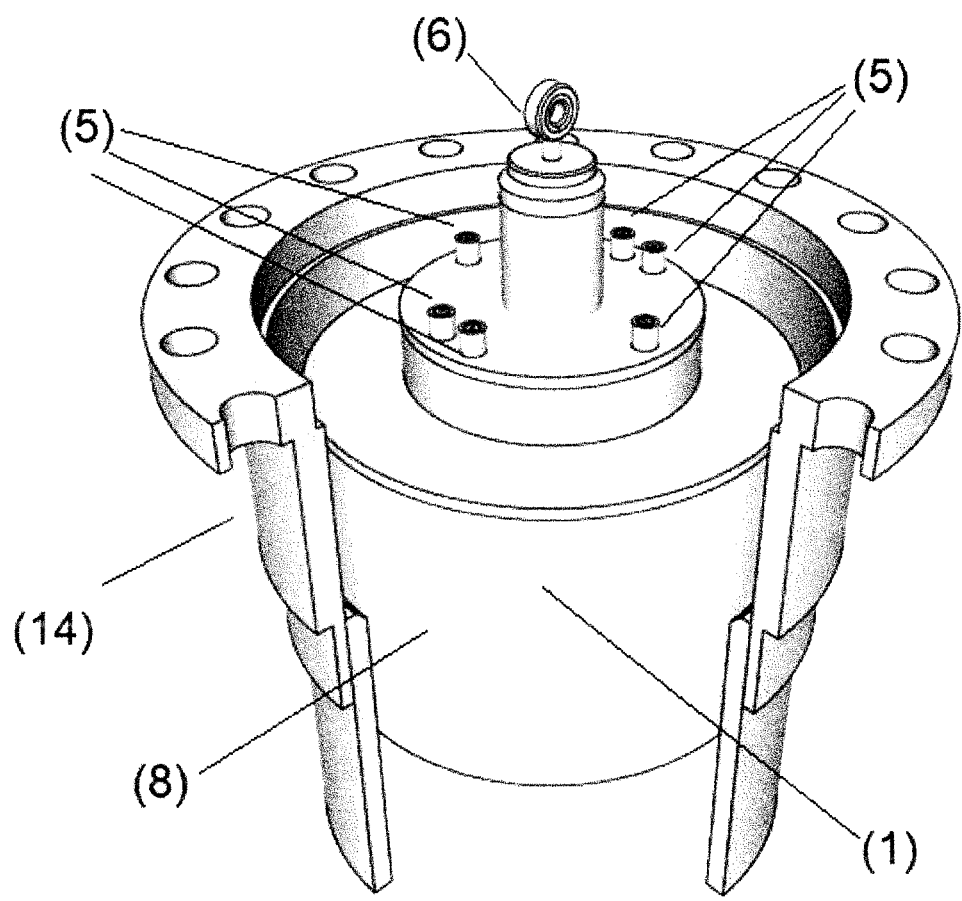
FIG. 5 is a view of the preheating device for welding of heads and coating for oil, gas, and geothermal wells of variable diameters and thicknesses in its mating position to the partially cut head and pipe to be welded.
Figure 6:
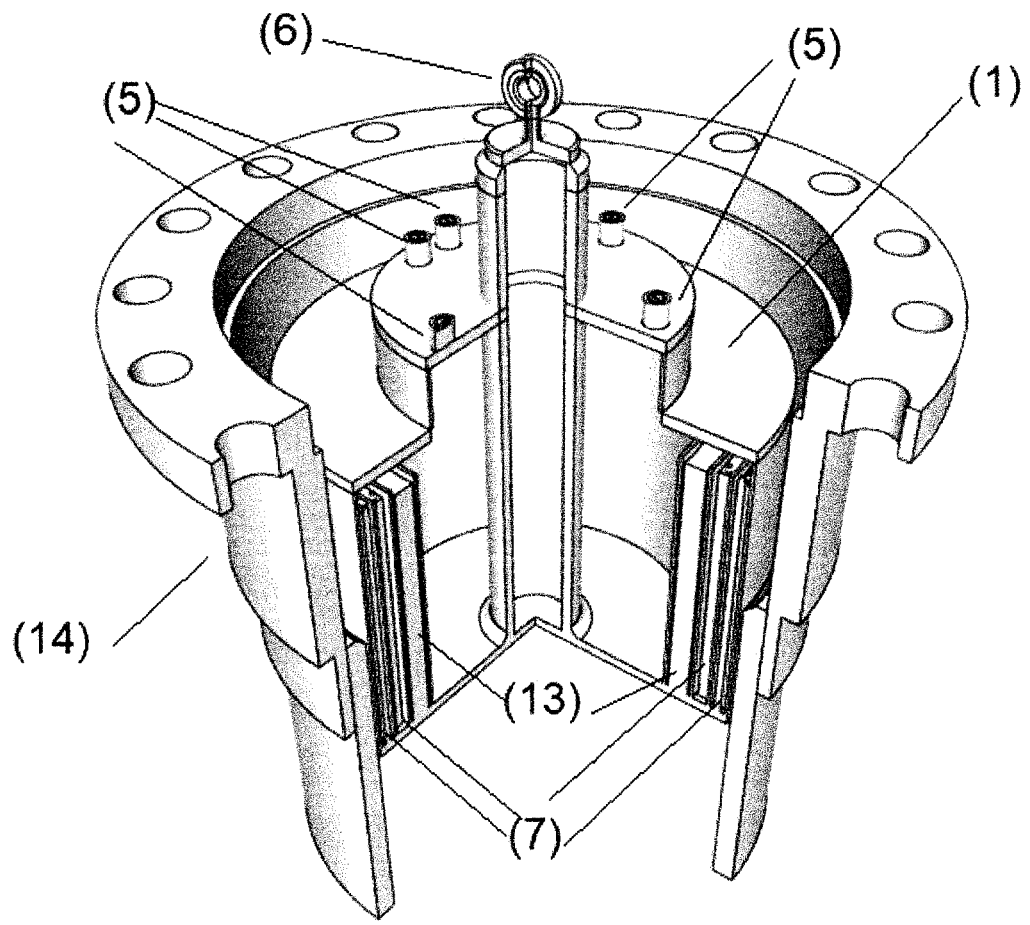
FIG. 6 is a cutaway view of the oil well coating and tubing head welding preheater showing its internal components.
Figure 7:
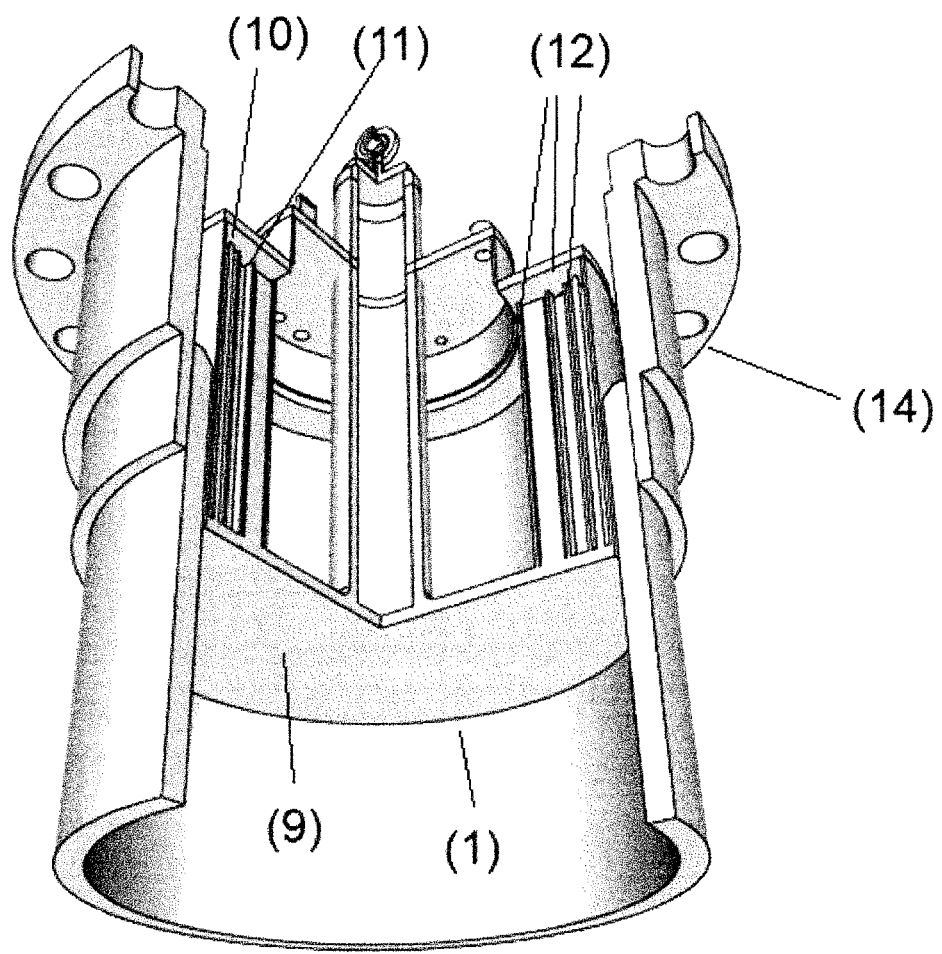
FIG. 7 is a bottom cutaway view of the oil well coating and tubing head welding preheater showing its internal components.

It is an object of the present invention to provide a preheating device for welding of heads and coating for oil, gas, and geothermal wells of variable diameters and thicknesses (1), wherein said device is an electric preheater wherein, by way of illustration but not limitation, it may be formed by flexible ceramic thermal resistors (7).

It is an object of the present invention that the preheating device for welding of heads and coating for oil, gas, and geothermal wells of variable diameters and thicknesses (1) has in its upper part a top cover (2) where the top cover has a fastening hook (6) that allows to vary and adjust the height of the preheating device for welding of heads and coating for oil, gas and geothermal wells of variable diameters and thicknesses with respect to the welding to be performed.

It is another object of the present invention that emanates from the top cover (2) and protrudes on its surface, the flexible ceramic thermal resistor terminals (5), and the thermocouple or thermistor terminals (3 and 4) are provided.

It is an object of the present invention that the preheating device for welding of heads and coating for oil, gas, and geothermal wells of variable diameters and thicknesses (1) facilitates the joining by welding of a header (14) which is installed on a coating pipe (15), wherein the header (14) and the coating pipe (15) require for better welding between both elements the supply of heat by the preheating process. The preheating process requires reaching temperatures of 400° F. to 600° F. (204° C. to 370° C.).

It is an object of the present invention to have a temperature controller where the preheating temperatures allow reaching the required temperature and this is carried out in a controlled and constant way during the whole welding process, which allows avoiding that the welding due to temperature difference fractures or crystallizes which would lead to leaks in such joints.

It is another object of the invention that the electric preheater has specific characteristics for each diameter of head and coating for the different stages of drilling oil, gas, and geothermal wells.

It is another object of the present invention that the preheating device for pipes of varying diameters and thicknesses comprises a steel body of rolled sheet steel (8).

It is another object of the present invention that the interior of the device comprises at least two flexible ceramic thermal resistors (7) and a ceramic fiber insulator (13).

It is another object of the present invention that the ceramic fiber insulator (13) limits heat dissipation toward the center of the device to avoid heat loss, thereby dissipating all heat toward the outside of the device and optimizing performance.

It is another object of the present invention that the device in its upper part comprises at least two thermocouple or thermistor terminals (3 and 4), wherein at least two thermocouples are used for sensing the lower temperature which is close to the coating pipe (15) and at least two thermocouples for the temperature in the upper part which is close to the head body in the welding zone.

It is another object of the present invention that, once the electrical preheating is connected to the power source, it will be controlled digitally, wherein the working intervals are programmed, establishing the minimum, maximum and safety limit intervals.

It is another object of the present invention that the controller will control in a digital manner by a physical or wireless connection of the working intervals, establishing the minimum, maximum, and safety limit intervals.

It is another object of the present invention that the control device has a temperature vs. time register.

It is another object of the present invention that the preheating device for welding of heads and coating for oil, gas, and geothermal wells of varying diameters and thicknesses (1) is designed for optimum heat transfer and coating, wherein the dimensions are established by API (American Petroleum Institute) Standards, for heads and coating pipes, for which the free passage for thicker coating is taken.

It is another object of the present invention that the preheating device for welding of heads and coating for oil, gas, and geothermal wells of variable diameters and thicknesses (1) is divided equidistantly by at least two rolled steel plates (12) parallel to each other and on which the flexible ceramic heating elements (7) and the ceramic fiber insulator (13) are placed and installed.

It is another object of the present invention that the preheating device for welding of coating heads and coating for oil, gas, and geothermal wells of varying diameters and thicknesses has at its lower end a lower cover.

It is another object of the present invention that the preheating device for welding of heads and coating for oil, gas, and geothermal wells of varying diameters and thicknesses has quick connectors for the flexible ceramic thermal resistors and the thermocouple or thermistor terminals within the same inner chamber of the device so that they can be represented by an identifier either (3) or (5).

| Coating pipe diameter | Coating pipe clearance in inches | Electric preheater outside diameter in inches |
|---|---|---|
| 20" | 18.543 | 18.343 |
| 16" | 14.127 | 13.927 |
| 13 5/8" | 12.188 | 11.988 |
| 13 3/8" | 12.003 | 11.803 |
| 9 5/8" | 7.875 | 7.676 |
| 7 5/8" | 5.876 | 5.676 |

What is claimed is:

1. A preheating device for a head welding and a casing pipe for oil, gas and geothermal wells of variable diameter and thickness, comprising:
   a temperature controller, that digitally controls, via a physical or a wireless connection, working time the working time intervals are for establishing a minimum, a maximum and a safety limit time interval, which determines and regulates a temperature necessary to achieve a given welding of the head welding or casing pipe, where said preheating device is an electric preheater that facilitates a union by the head welding that is installed with the casing pipe, where a temperature controller establishes preheating temperatures for the preheating device that allows a required temperature to be reached and this reaching of the preheating temperature is carried out in a controlled and constant way throughout a welding process, which prevents a welding due to temperature difference from fracturing or crystallizing, which leads to leaks in joints, where the temperature controller allows temperatures of 204° C. to 370° C. to be reached, and wherein the preheating device further comprising:
a rolled sheet steel body the rolled sheet body comprises at least two flexible ceramic thermal resistances;
a top cover comprising a plurality of flexible ceramic thermal resistance terminals and a thermocouple terminal or thermistor terminal, wherein the top cover has a fastening hook that allows a variation and an adjustment of a height of the preheating device for head welding and casing pipe for oil, gas and geothermal wells of variable diameter and thickness with respect to a welding to be performed; and
a bottom cover.

2. The preheating device in accordance with claim 1, whereby an interior of the rolled sheet steel body comprises divisions separated in parallel by at least two rolled steel plates parallel to each other and where said divisions are placed and installed the based on flexible ceramic thermal resistances and an insulation of a ceramic fiber.

3. The preheating device in accordance with claim 2, whereby the top cover comprises of at least two thermocouple terminals or thermistors, where the at least two thermocouples are used to census a lower temperature that is located near the casing pipe and the at least two thermocouples for temperature at the top cover that is close to a head body in a welding area.

4. The preheating device in accordance with claim 2, whereby a ceramic fiber insulator limits heat dissipation towards a preheating device center to prevent heat loss, thus dissipating all heat to an external part of the preheating device and optimizing operation of the preheating device.

5. The preheating device in accordance with claim 1, whereby a plurality of flexible ceramic thermal resistance terminals and the thermocouple of thermistor terminals are located within a same inner chamber of the preheating device.

* * * * *